United States Patent
Zhang et al.

(10) Patent No.: US 11,670,996 B2
(45) Date of Patent: Jun. 6, 2023

(54) ROTOR CORE WITH DIFFERENT GROOVE AND SKEW ANGLE CONFIGURATION OF STEP-SKEWING SYNCHRONOUS MOTOR

(71) Applicant: Jing-Jin Electric Technologies Co., Ltd., Beijing (CN)

(72) Inventors: Kaihe Zhang, Beijing (CN);
Liangliang Zhang, Beijing (CN);
Longyu Ju, Beijing (CN)

(73) Assignee: Jing-Jin Electric Technologies Co., Ltd, Beijing (CN)

( * ) Notice: Subject to any disclaimer, the term of this patent is extended or adjusted under 35 U.S.C. 154(b) by 84 days.

(21) Appl. No.: 17/374,307

(22) Filed: Jul. 13, 2021

(65) Prior Publication Data
US 2022/0021288 A1   Jan. 20, 2022

(30) Foreign Application Priority Data
Jul. 16, 2020   (CN) .......................... 202010686041.6

(51) Int. Cl.
*H02K 29/03* (2006.01)
*H02K 1/276* (2022.01)

(52) U.S. Cl.
CPC ............ *H02K 29/03* (2013.01); *H02K 1/276* (2013.01); *H02K 2201/06* (2013.01); *H02K 2213/03* (2013.01)

(58) Field of Classification Search
CPC ........ H02K 1/27; H02K 1/276; H02K 1/2766; H02K 9/03; H02K 15/024; H02K 21/14; H02K 29/03; H02K 2201/06; H02K 2213/03

USPC ............. 310/156.53, 156.56, 156.57, 156.47
See application file for complete search history.

(56) References Cited

U.S. PATENT DOCUMENTS

| 6,218,753 | B1* | 4/2001 | Asano | H02K 1/276 |
| | | | | 310/156.53 |
| 6,486,581 | B2* | 11/2002 | Miyashita | H02K 21/14 |
| | | | | 310/156.01 |
| 6,525,442 | B2* | 2/2003 | Koharagi | H02K 1/2766 |
| | | | | 310/156.56 |

(Continued)

FOREIGN PATENT DOCUMENTS

| CN | 110365180 A | * 10/2019 |
| CN | 110365180 A | 10/2019 |

(Continued)

OTHER PUBLICATIONS

CN-110365180-A English Translation.*

(Continued)

*Primary Examiner* — Maged M Almawri
(74) *Attorney, Agent, or Firm* — Arentfox Schiff LLP (57) ABSTRACT

A rotor core is provided for a step-skewing motor that includes rotor core segments mutually staggered by a preset angle. Each of the rotor core segments includes magnet slots along a circumferential direction, with a magnet provided in the magnet slot. An outer circular surface of each of the rotor core segments is provided thereon with a number of auxiliary grooves extending across the segment in an axial direction, and positions and/or cross-sectional shapes of the auxiliary grooves on the rotor core segments are not completely same so as to suppress torque ripple and vibration noise when the motor rotates.

14 Claims, 4 Drawing Sheets

(56) References Cited

U.S. PATENT DOCUMENTS

| | | | |
|---|---|---|---|
| 6,597,079 B2* | 7/2003 | Miyashita | H02K 1/276 310/156.48 |
| 6,917,133 B2* | 7/2005 | Koharagi | H02K 21/16 310/156.56 |
| 7,151,335 B2* | 12/2006 | Tajima | B60L 50/66 310/156.56 |
| 7,230,359 B2* | 6/2007 | Iles-Klumpner | H02K 1/276 310/156.56 |
| 7,612,480 B2* | 11/2009 | Fujii | H02K 1/2766 310/156.56 |
| 7,808,143 B2* | 10/2010 | Lee | H02K 1/2766 310/156.56 |
| 7,843,101 B2* | 11/2010 | Ito | H02K 1/28 417/423.1 |
| 8,179,011 B2* | 5/2012 | Takemoto | H02K 21/16 310/156.53 |
| 8,368,273 B2* | 2/2013 | Hino | B60L 50/61 310/156.47 |
| 9,077,224 B2* | 7/2015 | Morishita | H02K 1/2766 |
| 9,236,775 B2* | 1/2016 | Takahashi | H02K 21/14 |
| 9,985,484 B2* | 5/2018 | Liang | H02K 1/2766 |
| 10,396,609 B2* | 8/2019 | Mae | H02K 1/2766 |
| 10,958,120 B2* | 3/2021 | Tang | H02K 1/2766 |
| 2002/0047432 A1* | 4/2002 | Miyashita | H02K 21/14 310/156.48 |
| 2003/0178905 A1* | 9/2003 | Koharagi | H02K 1/2766 310/156.38 |
| 2003/0222526 A1* | 12/2003 | Matsunobu | H02K 29/03 310/156.56 |
| 2004/0017123 A1* | 1/2004 | Miyashita | H02K 1/276 310/156.53 |
| 2005/0121990 A1* | 6/2005 | Kaneko | H02K 1/276 310/156.47 |
| 2005/0168089 A1* | 8/2005 | Miyashita | H02K 29/03 310/156.57 |
| 2005/0200223 A1* | 9/2005 | Tajima | H02K 1/2766 310/156.55 |
| 2007/0085436 A1* | 4/2007 | Tajima | B60L 50/66 310/156.53 |
| 2007/0126305 A1* | 6/2007 | Okuma | H02K 1/2766 310/156.53 |
| 2008/0203842 A1* | 8/2008 | Yoshikawa | H02K 1/276 310/156.01 |
| 2008/0224558 A1* | 9/2008 | Ionel | H02K 1/2766 310/156.57 |
| 2009/0179518 A1* | 7/2009 | Tajima | B60L 50/51 310/156.53 |
| 2010/0213780 A1* | 8/2010 | Lee | H02K 1/2766 310/156.53 |
| 2011/0031843 A1* | 2/2011 | Liang | H02K 1/2773 310/216.096 |
| 2011/0133590 A1* | 6/2011 | Lokhandwalla | H02K 1/2766 310/156.53 |
| 2011/0163624 A1* | 7/2011 | Hori | H02K 1/2766 310/156.53 |
| 2011/0254474 A1* | 10/2011 | Saito | B60L 15/20 310/156.53 |
| 2012/0038236 A1* | 2/2012 | Tajima | B60L 50/66 310/156.43 |
| 2012/0139378 A1* | 6/2012 | Endo | H02K 15/03 29/598 |
| 2013/0270958 A1* | 10/2013 | Takahashi | H02K 1/274 310/156.38 |
| 2013/0285500 A1* | 10/2013 | Kinashi | H02K 1/276 310/156.53 |
| 2014/0035420 A1* | 2/2014 | Li | H02K 1/2773 310/156.47 |
| 2014/0217849 A1* | 8/2014 | Soma | H02K 1/2766 310/156.53 |
| 2014/0361646 A1* | 12/2014 | Saito | B60L 15/007 310/51 |
| 2015/0069874 A1* | 3/2015 | Iki | H02K 1/274 310/156.11 |
| 2015/0194849 A1* | 7/2015 | Kayano | H02K 1/276 310/156.53 |
| 2015/0270749 A1* | 9/2015 | Mochida | H02K 1/276 310/156.53 |
| 2015/0380996 A1* | 12/2015 | Kim | H02K 1/2773 310/156.56 |
| 2016/0020653 A1* | 1/2016 | Ueda | H02K 1/278 310/43 |
| 2016/0365762 A1* | 12/2016 | Liang | H02K 1/2706 |
| 2017/0104376 A1* | 4/2017 | Nakagawa | H02K 1/2773 |
| 2018/0309333 A1* | 10/2018 | Makino | H02K 1/27 |
| 2019/0036398 A1 | 1/2019 | Liang et al. | |
| 2019/0089214 A1* | 3/2019 | Tang | H02K 1/2766 |
| 2021/0184520 A1* | 6/2021 | Zhang | H02K 1/24 |

FOREIGN PATENT DOCUMENTS

| | | |
|---|---|---|
| EP | 1542335 A1 | 6/2005 |
| JP | 2019115205 A | 7/2019 |
| KR | 102062461 B1 | 2/2020 |

OTHER PUBLICATIONS

European Search Report dated Dec. 3, 2021 issued in corresponding European application No. 21184400.6.

Japanese Office Action dated May 2, 2022 issued in corresponding Japanese counterpart application No. 2021-117709.

* cited by examiner

FIG. 7

ROTOR CORE WITH DIFFERENT GROOVE AND SKEW ANGLE CONFIGURATION OF STEP-SKEWING SYNCHRONOUS MOTOR

CROSS-REFERENCE TO RELATED APPLICATION

This application claims priority to CN application No. 202010686041.6, filed Jul. 16, 2020, the disclosure of which is hereby incorporated by reference in its entirety.

TECHNICAL FIELD

The present disclosure belongs to the technical field of motors, and particularly relates to a rotor core of a step-skewing motor and a permanent magnet synchronous motor.

BACKGROUND

The permanent magnet synchronous motor generates electromagnetic torque through the interaction of the armature magnetic field and the rotor magnetic field. Among them, the armature magnetic field is generated by the stator current, and the rotor magnetic field is provided by the rotor permanent magnets. The combined magnetic field of the two magnetic fields in the air gap of the motor is the air gap magnetic field. Due to the influence of stator slotting, iron core magnetic saturation and other factors, the air gap magnetic field is not a standard sine wave and contains harmonic components, which will generate torque ripple and obvious radial electromagnetic forces on certain orders, and result in the noise and vibration of the motor.

For some applications such as new energy vehicles, the NVH (Noise, Vibration, Harshness) quality of the motor will directly affect the driving experience of the vehicle. Therefore, in the design process of the motor body, the torque ripple should be minimized, and the radial electromagnetic force of certain specific orders should be suppressed. At present, the commonly used methods include rotor skewing and forming auxiliary grooves on the rotor. The rotor skewing reduces the cogging effect caused by the stator slotting by staggering the magnetic poles at a certain angle. The auxiliary grooves are formed on the rotor punching pieces to optimize the air gap magnetic flux density waveform. In the step-skewing motor, the magnets are oriented at different angles in different rotor core segments, which will result in differences in the combined air gap magnetic flux density waveforms in different segments. In the prior art, the segments adopt the same punching piece structure, and at this point the comprehensive vibration and noise reduction effect is not optimal.

SUMMARY

In view of the above problems, the present disclosure discloses a rotor core of a step-skewing motor and a permanent magnet synchronous motor to overcome the above problems or at least partially solve the above problems.

In order to achieve the above object, the present disclosure adopts the following technical solutions.

An aspect of the present disclosure discloses a rotor core of a step-skewing motor, wherein the rotor core comprises a plurality of rotor core segments mutually staggered by a preset angle, and the rotor core segments are formed by laminating rotor punching pieces;

each of the rotor core segments is provided therein with magnet slots along a circumferential direction, and a magnet may be provided in the magnet slot;

an outer circular surface of each of the rotor core segments is provided thereon with a number of auxiliary grooves extending across the segment in an axial direction, and positions and/or cross-sectional shapes of the auxiliary grooves on the rotor core segments are not completely the same so as to suppress torque ripple and vibration noise when the motor rotates.

Further, a plurality of the rotor core segments may be arranged in groups, each two groups are symmetrical in an axial direction, and the shapes and/or positions of the auxiliary grooves on the rotor core segments in each group are not completely the same.

Further, the group comprises n number of adjacent rotor core segments, which are respectively an $N_1$ rotor core segment, an $N_2$ rotor core segment, an $N_3$ rotor core segment, . . . , and an $N_n$ rotor core segment;

the $N_1$ rotor core segment is provided with a plurality of $N_1$ auxiliary grooves, the $N_2$ rotor core segment is provided with a plurality of $N_2$ auxiliary grooves, the $N_3$ rotor core segment is provided with a plurality of $N_3$ auxiliary grooves, . . . , and the $N_n$ rotor core segment is provided with a plurality of $N_n$ auxiliary grooves;

center points of two $N_1$ auxiliary grooves on two sides of a magnetic pole axis of the $N_1$ rotor core segment are offset respectively by an $N_{1-1}$ angle and an $N_{1-2}$ angle with respect to the magnetic pole axis, center points of two $N_2$ auxiliary grooves on two sides of a magnetic pole axis of the $N_2$ rotor core segment are offset respectively by an $N_{2-1}$ angle and an $N_{2-2}$ angle with respect to the magnetic pole axis, center points of two $N_3$ auxiliary grooves on two sides of a magnetic pole axis of the $N_3$ rotor core segment are offset respectively by an $N_{3-1}$ angle and an $N_{3-2}$ angle with respect to the magnetic pole axis, . . . , and center points of two $N_1$ auxiliary grooves on two sides of a magnetic pole axis of the $N_1$ rotor core segment are offset respectively by an $N_{n-1}$ angle and an $N_{n-2}$ angle with respect to the magnetic pole axis;

the $N_{1-1}$ and $N_{1-2}$ angles, the $N_{2-1}$ and $N_{2-2}$ angles, the $N_{3-1}$ and $N_{3-2}$ angles, . . . , and the $N_{n-1}$ and $N_{n-2}$ angles are obtained by rotating an $N_x$ rotor core segment in a skewing pole rotation direction of the rotor core segment, where $x \in [1, n]$.

Further, the group comprises three adjacent rotor core segments, and if in the three adjacent rotor core segments, the $N_1$ auxiliary groove and the $N_3$ auxiliary groove are offset respectively by an $N_1$ offset angle and an $N_3$ offset angle with respect to the $N_2$ auxiliary groove, the $N_{1-1}$ angle=the $N_{2-1}$ angle−the preset angle+the $N_1$ offset angle;

the $N_{1-2}$ angle=the $N_{2-2}$ angle+the preset angle−the $N_1$ offset angle;

the $N_{3-1}$ angle=the $N_{2-1}$ angle+the preset angle−the $N_3$ offset angle;

the $N_{3-2}$ angle=the $N_{2-2}$ angle−the preset angle+the $N_3$ offset angle.

Further, the $N_1$ offset angle, the $N_3$ offset angle and the preset angle are different from each other.

Further, the $N_1$ offset angle and the $N_3$ offset angle are both less than the preset angle.

Further, the $N_1$ offset angle and the $N_3$ offset angle are both zero.

Further, the $N_1$ offset angle or the $N_3$ offset angle is equal to the preset angle.

Further, cross-sectional shapes of the auxiliary grooves may be arc, triangle, square, trapezoid or rectangle.

Another aspect of the present disclosure discloses a permanent magnet synchronous motor comprising a stator and a rotor, wherein the rotor is provided with the rotor core as stated above.

The advantages and beneficial effects of the present disclosure are as follows.

In the rotor core of the present disclosure, since on the outer circular surface of each rotor core segment a number of auxiliary grooves extending across the segment in an axial direction are provided, and positions and/or cross-sectional shapes of the auxiliary grooves on the rotor core segments are not completely the same, when the motor rotates, the torque ripple and radial electromagnetic force generated by each segment of the rotor core are respectively suppressed to a low level, thereby reducing the overall torque ripple and radial electromagnetic force of the motor, effectively suppressing the vibration and noise of the motor, and thus obtaining a better comprehensive vibration and noise reduction effect.

BRIEF DESCRIPTION OF DRAWINGS

By reading the detailed description of the preferred embodiments below, various other advantages and benefits will become clear to a person of ordinary skill in the art. The drawings are only used for the purpose of illustrating the preferred embodiments, and should not be considered as a limitation to the present disclosure. Moreover, throughout the drawings, the same reference numerals are used to denote the same components. In the drawings.

In the drawings: 1: a magnet slot; 2-1: an $N_1$ rotor core segment; 2-2: an $N_2$ rotor core segment; 2-3: an $N_3$ rotor core segment; 3-1: an $N_1$ auxiliary groove; 3-2: an $N_2$ auxiliary groove; 3-3: an $N_3$ auxiliary groove; 4-1-1: an $N_{1-1}$ angle; 4-1-2: an $N_{1-2}$ angle; 4-2-1: an $N_{2-1}$ angle; 4-2-2: an $N_{2-2}$ angle; 4-3-1: an $N_{3-1}$ angle; 4-3-2: an $N_{3-2}$ angle; 5: a preset angle; 6-1: an $N_1$ offset angle; 6-2: an $N_3$ offset angle.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the embodiments described are only part of the embodiments of the present disclosure, rather than all of the embodiments. Based on the embodiments in the present disclosure, all other embodiments obtained by a person of ordinary skill in the art without paying creative work shall fall within the protection scope of the present disclosure.

The technical solutions according to the embodiments of the present disclosure will be described in detail below with reference to the accompanying drawings.

First Embodiment

Figure 1:
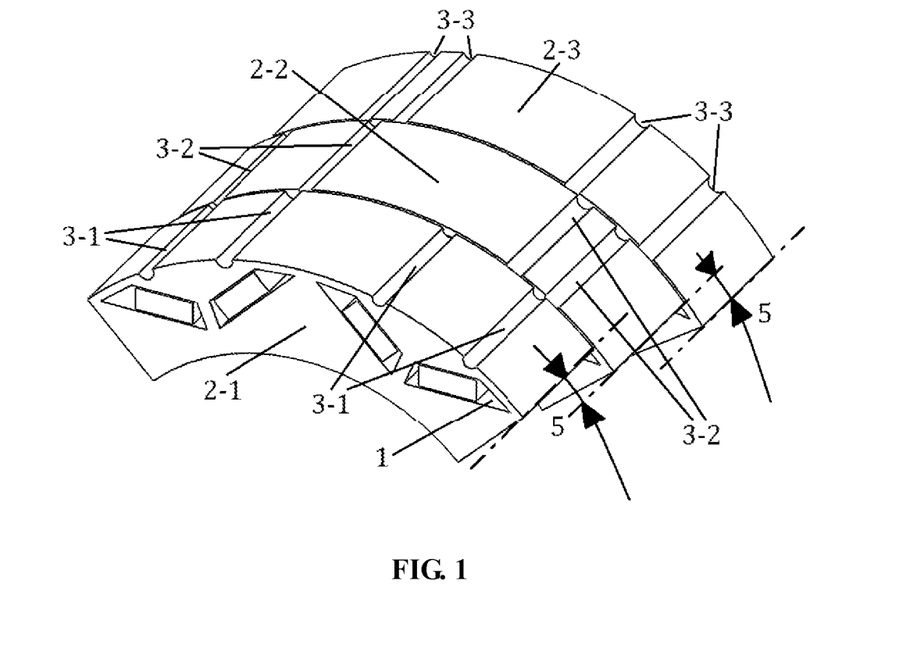
FIG. 1 is a partial view of the structure of a rotor core in an embodiment of the present disclosure.

An embodiment of the present disclosure discloses a rotor core of a step-skewing motor. As shown in FIG. 1, the rotor core comprises a plurality of rotor core segments mutually staggered by a preset angle 5, and the rotor core segments are formed by laminating rotor punching pieces which are formed by stamping. When the rotor core segments are assembled, the rotor core segments are mutually staggered by a preset angle 5, thereby reducing the cogging effect caused by slotting on the stator.

Each of the rotor core segments is provided therein with magnet slots 1 along a circumferential direction, and a magnet may be provided in the magnet slot 1. The quantity of magnet slots 1 is an even number, and two adjacent magnet slots 1 are arranged symmetrically.

The outer circular surface of each of the rotor core segments is provided thereon with a number of auxiliary grooves extending across the segment in an axial direction, and the positions and/or cross-sectional shapes of the auxiliary grooves on the rotor core segments are not completely the same so as to suppress torque ripple and vibration noise when the motor rotates.

In the rotor core of the present disclosure, on the outer circular surface of each rotor core segment a number of auxiliary grooves extending across the segment in an axial direction are provided, the positions and/or cross-sectional shapes of the auxiliary grooves on the rotor core segments are not completely the same, and at least on two rotor core segments the positions and/or cross-sectional shapes of the auxiliary grooves are different. In the prior art, although auxiliary grooves are designed on the rotor core segments, the positions and cross-sectional shapes of the auxiliary grooves on the rotor core segments are all the same. As a result, the vibration and noise reduction effect in some rotor core segments are good, but the remaining rotor core segments will have a higher air gap magnetic flux density harmonic components, and the comprehensive vibration and noise reduction effect is not obvious.

The present embodiment of the present disclosure proposes a new structure for optimizing the air gap magnetic flux density waveform of each rotor core segment separately, so as to more effectively disperse the harmonic energy. When the motor rotates, the torque ripple and radial electromagnetic force generated by each segment of the rotor core are respectively suppressed to a low level, thereby reducing the overall torque ripple and radial electromagnetic force of the motor, effectively suppressing the vibration and noise of the motor, and thus obtaining a better comprehensive vibration and noise reduction effect. In addition, if some rotor core segments have the same positions of auxiliary grooves, the rotor punching pieces in the rotor core segments can be manufactured using one set of molds to reduce production costs.

In an embodiment, the rotor core segments are arranged in groups, that is, the rotor core comprises multiple groups of rotor core segments, and each two groups are arranged symmetrically in the axial direction, so that the rotor core structure is symmetrical as a whole to prevent the occurrence of imbalance in rotation. Moreover, each group of rotor core segments comprises a number of rotor core segments. For example, each group of rotor core segments may include three rotor core segments. Preferably, during assembling, the two groups are arranged reversely and symmetrically in the axial direction, so as to form a complete structure formed by six rotor core segments, and a better overall effect is obtained.

Of course, the width of the rotor core segments (for example, the quantity of rotor punching pieces) can be arbitrarily selected, and is not particularly limited in the present embodiment.

In an embodiment, as shown in FIG. 1 to FIG. 5, the rotor core segments are arranged in groups, and the auxiliary grooves in the multiple rotor core segments in each group are realized by a specific design structure, for example, any one rotor core segment may be rotated in the left and right directions to obtain other rotor core segments in the group, thereby optimizing the overall design of the rotor core segments in the group.

Specifically, the group comprises n number of the rotor core segments adjacent to each other, which are respectively an $N_1$ rotor core segment, an $N_2$ rotor core segment, an $N_3$ rotor core segment, . . . , and an $N_n$ rotor core segment, where n is a natural number greater than 1. FIG. 1 to FIG. 5 show an example of the structure in which each group comprises three rotor core segments.

Figure 2:
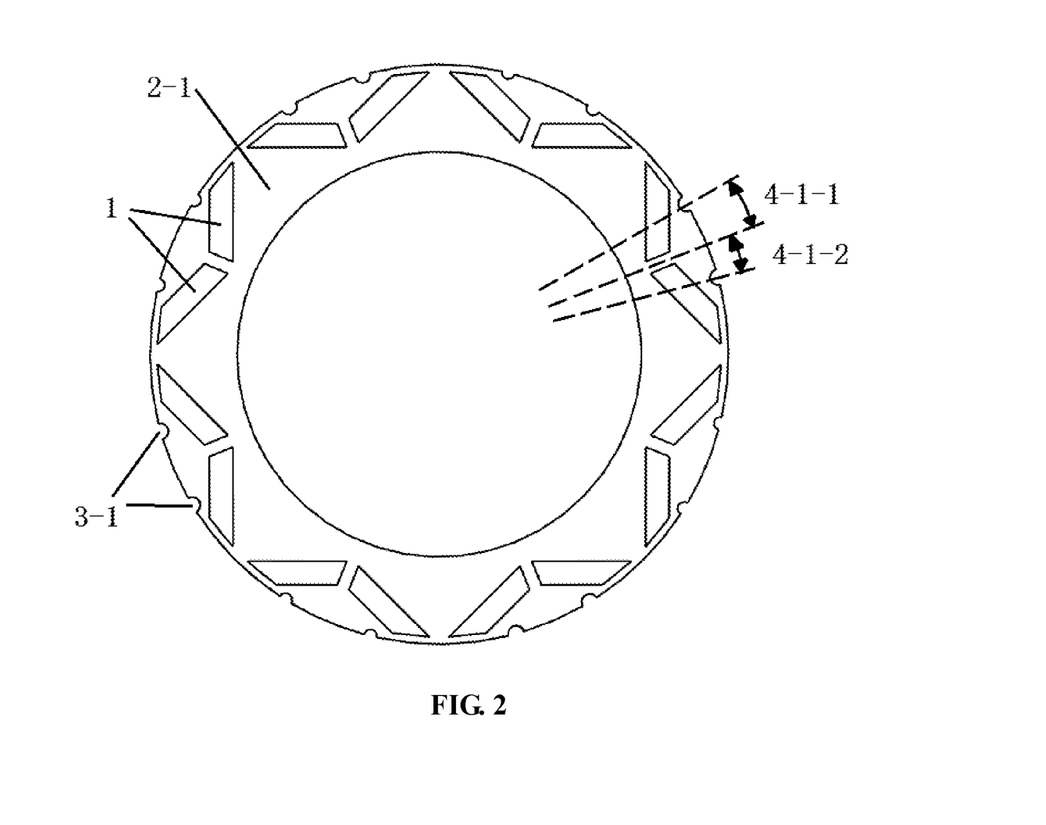
FIG. 2 is a radial cross-sectional view of the N1 rotor core segment in an embodiment of the present disclosure.
Figure 3:
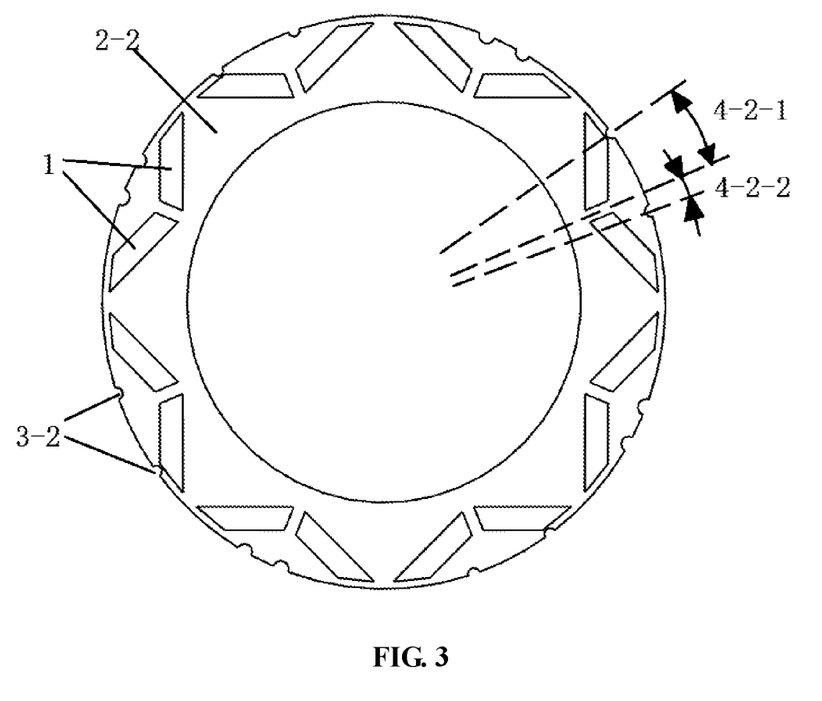
FIG. 3 is a radial cross-sectional view of the N2 rotor core segment in an embodiment of the present disclosure.
Figure 4:
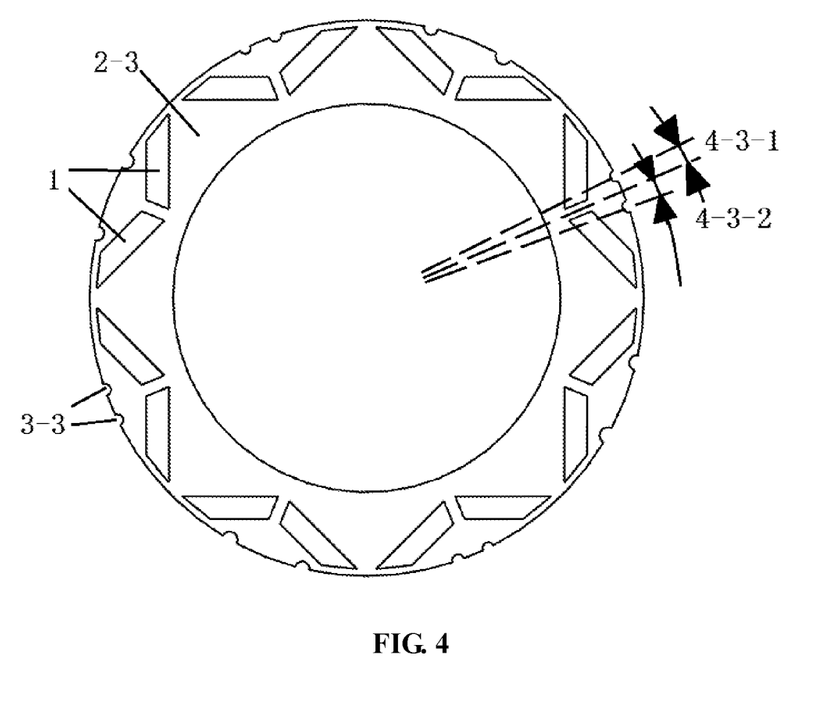
FIG. 4 is a radial cross-sectional view of the $N_3$ rotor core segment in an embodiment of the present disclosure.

The $N_1$ rotor core segment 2-1 is provided with a plurality of $N_1$ auxiliary grooves 3-1, the $N_2$ rotor core segment 2-2 is provided with a plurality of $N_2$ auxiliary grooves 3-2, the $N_3$ rotor core segment 2-3 is provided with a plurality of $N_3$ auxiliary grooves 3-3, . . . , and the $N_n$ rotor core segment is provided with a plurality of $N_n$ auxiliary grooves.

The center points of two $N_1$ auxiliary grooves 3-1 on two sides of a magnetic pole axis of the $N_1$ rotor core segment 2-1 are offset respectively by an $N_{1-1}$ angle 4-1-1 and an $N_{1-2}$ angle 4-1-2 with respect to the magnetic pole axis; the center points of two $N_2$ auxiliary grooves 3-2 on two sides of a magnetic pole axis of the $N_2$ rotor core segment 2-2 are offset respectively by an $N_{2-1}$ angle 4-2-1 and an $N_{2-2}$ angle 4-2-2 with respect to the magnetic pole axis; the center points of two $N_3$ auxiliary grooves 3-3 on two sides of a magnetic pole axis of the $N_3$ rotor core segment 2-3 are offset respectively by an $N_{3-1}$ angle 4-3-1 and an $N_{3-2}$ angle 4-3-2 with respect to the magnetic pole axis; . . . ; the center points of two $N_1$ auxiliary grooves on two sides of a magnetic pole axis of the $N_1$ rotor core segment are offset respectively by an $N_{1-1}$ angle and an $N_{n-2}$ angle with respect to the magnetic pole axis. The values of the $N_{1-1}$ angle 4-1-1, the $N_{1-2}$ angle 4-1-2, the $N_{2-1}$ angle 4-2-1, the $N_{2-2}$ angle 4-2-2, the $N_{3-1}$ angle 4-3-1, the $N_{3-2}$ angle 4-3-2, the $N_{n-1}$ angle, and the $N_{n-2}$ angle are not completely the same, which can effectively disperse the harmonic energy in the air gap magnetic density distribution and achieve the object of suppressing vibration and noise.

The $N_{1-1}$ angle 4-1-1 and the $N_{1-2}$ angle 4-1-2, the $N_{2-1}$ angle 4-2-1 and the $N_{2-2}$ angle 4-2-2, the $N_{3-1}$ angle 4-3-1 and the $N_{3-2}$ angle 4-3-2, the $N_{1-1}$ angle and the $N_{n-2}$ angle are obtained by rotating an $N_x$ rotor core segment along a skewing pole rotation direction of the rotor core segment, where $x \in [1, n]$. For example, the first segment of the rotor core may be used as a reference, and the offset angles of the other segments of the rotor core with respect to the magnetic pole axis are obtained by rotating in a skewing pole rotation direction of the rotor core segment. Of course, any segment of the rotor core may be used as a reference. Take each group comprising three rotor core segments as an example, and take the middle rotor core segment as a reference, for the prior art, refer to FIG. 5, the $N_{1-1}$ angle 4-1-1 and the $N_{1-2}$ angle 4-1-2 are obtained by rotating the $N_1$ rotor core segment 2-1 counterclockwise by the preset angle 5 with the $N_2$ rotor core segment 2-2 as the reference, the $N_{3-1}$ angle 4-3-1 and the $N_{3-2}$ angle 4-3-2 are obtained by rotating the $N_3$ rotor core segment 2-3 clockwise by the preset angle 5 with the $N_2$ rotor core segment 2-2 as the reference.

Figure 5:
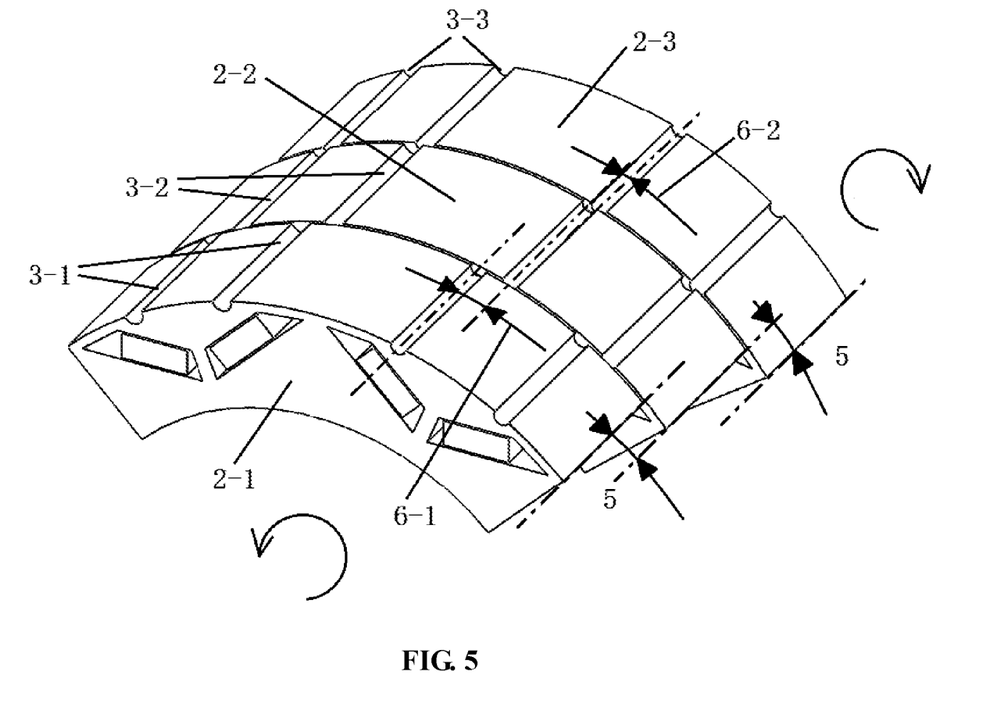
FIG. 5 is a partial view of the structure of a rotor core in an embodiment of the present disclosure.

In an embodiment, as shown in FIG. 5, the group comprises three adjacent rotor core segments, and in the three adjacent rotor core segments, the $N_1$ auxiliary groove 3-1 and the $N_3$ auxiliary groove 3-3 are offset respectively by an $N_1$ offset angle 6-1 and an $N_3$ offset angle 6-2 with respect to the $N_2$ auxiliary groove 3-2.

The numerical relationship among the $N_{1-1}$ angle 4-1-1, the $N_{1-2}$ angle 4-1-2, the $N_{3-1}$ angle 4-3-1, the $N_{3-2}$ angle 4-3-2 and the $N_{2-1}$ angle 4-2-1, the $N_{2-2}$ angle 4-2-2 is as follows. The $N_{2-1}$ angle 4-2-1 and the $N_{2-2}$ angle 4-2-2 may be the same or different.

the $N_{1-1}$ angle 4-1-1=the $N_{2-1}$ angle 4-2-1–the preset angle 5+the $N_1$ offset angle 6-1;

the $N_{1-2}$ angle 4-1-2=the $N_{2-2}$ angle 4-2-2+the preset angle 5–the $N_1$ offset angle 6-1;

the $N_{3-1}$ angle 4-3-1=the $N_{2-1}$ angle 4-2-1+the preset angle 5–the $N_3$ offset angle 6-2;

the $N_{3-2}$ angle 4-3-2=the $N_{2-2}$ angle 4-2-2–the preset angle 5+the $N_3$ offset angle 6-2.

In a preferred embodiment, the $N_1$ offset angle 6-1, the $N_3$ offset angle 6-2 and the preset angle 5 are different from each other.

In an embodiment, as shown in FIG. 5, the $N_1$ offset angle 6-1 and the $N_3$ offset angle 6-2 are both less than the preset angle 5. At this point, the vibration and noise reduction effect of the rotor core is the best.

Figure 6:
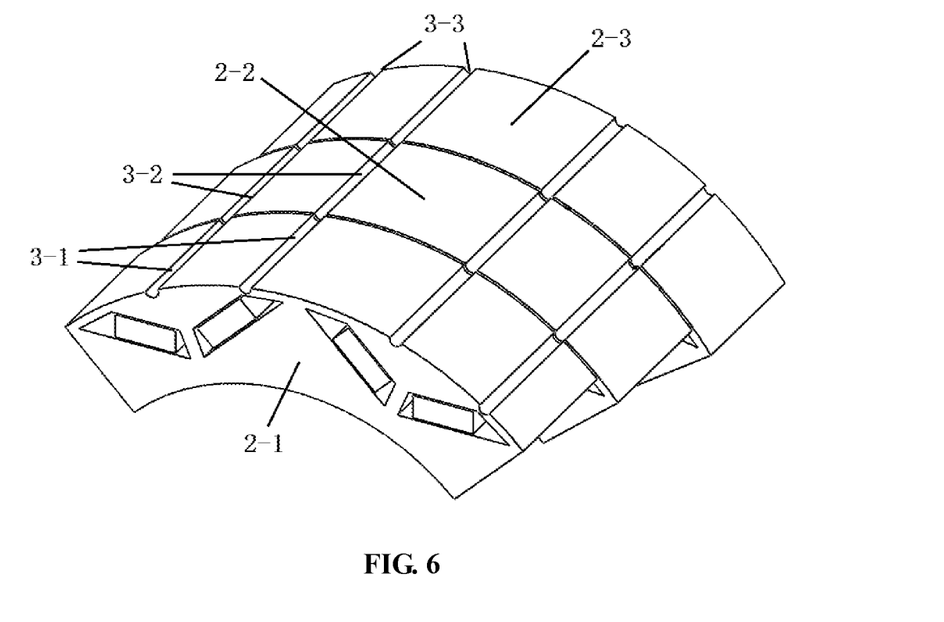
FIG. 6 is a partial view of the structure of a rotor core in an embodiment of the present disclosure.

In an embodiment, as shown in FIG. 6, the $N_1$ offset angle 6-1 and the $N_3$ offset angle 6-2 are both zero. After the rotor core is assembled, the $N_1$ auxiliary groove 3-1, the $N_2$ auxiliary groove 3-2 and the $N_3$ auxiliary groove 3-3 are in a straight line. At this point, there are a number of continuous auxiliary grooves on the rotor core. Moreover, since the $N_1$ offset angle 6-1 and the $N_3$ offset angle 6-2 are both zero, the $N_1$ rotor core segment 2-1 and the $N_3$ rotor core segment 2-3 are completely symmetrical, and can be manufactured using the same set of molds.

Figure 7:
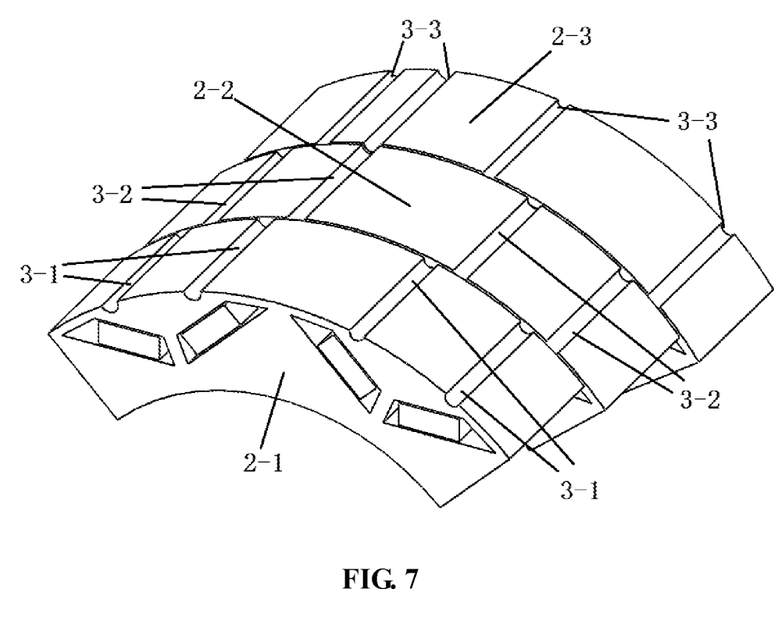
FIG. 7 is a partial view of the structure of a rotor core in an embodiment of the present disclosure.

In an embodiment, as shown in FIG. 7, the $N_1$ offset angle 6-1 or the $N_3$ offset angle 6-2 is equal to the preset angle 5.

When the $N_1$ offset angle 6-1 equals to the preset angle 5, the punching piece structure of the $N_1$ rotor core segment 2-1 and the $N_2$ rotor core segment 2-2 are completely the same, and both are different from the $N_3$ rotor core segments 2-3. In a step-skewing motor, if the rotor punching piece design of all segments are completely the same, usually the air gap magnetic flux density harmonic components of the middle segment (i.e., the $N_2$ rotor core segment 2-2) and a segment on two sides (for example, the $N_1$ rotor core segment 2-1) is not high, but the air gap magnetic flux density harmonic components of the other segment on two sides (for example, the $N_3$ rotor core segment 2-3) will be high. In the present embodiment, by further optimizing the $N_3$ rotor core segment 2-3, the position of the $N_3$ auxiliary groove 3-3 on the $N_3$ rotor core segment 2-3 is different from the positions of auxiliary grooves on the $N_1$ rotor core segment 2-1 and the $N_2$ rotor core segment 2-2, and a better vibration and noise reduction effect can be achieved. When the $N_3$ offset angle 6-2 equals to the preset angle 5, the $N_3$ rotor core segment 2-3 and the $N_2$ rotor core segment 2-2 have completely the same structure, and they are different from the $N_1$ rotor core segment 2-1.

In an embodiment, the cross-sectional shapes of the auxiliary grooves may be arc, triangle, square, trapezoid or rectangle. Of course, the cross-sectional shapes of the auxiliary grooves are not limited to the above shapes, and other shapes are also within the protection scope of the present disclosure.

Second Embodiment

An embodiment of the present disclosure discloses a permanent magnet synchronous motor. The permanent magnet synchronous motor comprises a stator and a rotor, and the rotor is provided with a rotor core as described above. The permanent magnet synchronous motor in the present embodiment has low vibration and noise as well as high NVH (Noise, Vibration, Harshness) quality.

In sum, the present disclosure discloses a rotor core of a step-skewing motor and a permanent magnet synchronous motor. The rotor core comprises a plurality of rotor core segments mutually staggered by a preset angle, and the rotor core segments are formed by laminating rotor punching pieces; each of the rotor core segments is provided therein with magnet slots along a circumferential direction, and a magnet may be provided in the magnet slot; an outer circular surface of each of the rotor core segments is provided thereon with a number of auxiliary grooves extending across the segment in an axial direction, and positions and/or cross-sectional shapes of the auxiliary grooves on the rotor core segments are not completely the same so as to suppress torque ripple and vibration noise when the motor rotates. In the rotor core of the present disclosure, since a number of auxiliary grooves extending across the segment in an axial direction are provided on the outer circular surface of each rotor core segment, and positions and/or cross-sectional shapes of the auxiliary grooves on the rotor core segments are not completely the same, when the motor rotates, the torque ripple and radial electromagnetic force generated by each segment of the rotor core are respectively suppressed to a low level, thereby reducing the overall torque ripple and radial electromagnetic force of the motor, effectively suppressing the vibration and noise of the motor, and thus obtaining a better comprehensive vibration and noise reduction effect.

The above descriptions are only embodiments of the present disclosure, and are not used to limit the protection scope of the present disclosure. Any modification, equivalent replacement, improvement, expansion, etc. made within the spirit and principle of the present disclosure shall all be included in the protection scope of the present disclosure.

What is claimed is:

1. A rotor core of a step-skewing motor, comprising:
a plurality of rotor core segments mutually staggered by a preset angle,
wherein each of the rotor core segments includes therein magnet slots along a circumferential direction,
wherein at least one magnet is disposed in the magnet slots, and
wherein an outer circular surface of each of the plurality of rotor core segments is provided thereon with a number of auxiliary grooves extending across the respective segment in an axial direction, and at least one of positions and cross-sectional shapes of the auxiliary grooves on the rotor core segments are not completely the same so as to suppress torque ripple and vibration noise when the step-skewing motor rotates,
wherein the plurality of the rotor core segments are arranged in groups,
wherein a group comprises n number of adjacent rotor core segments, which are respectively an $N_1$ rotor core segment, an $N_2$ rotor core segment, an $N_3$ rotor core segment, . . . , and an $N_n$ rotor core segment;
wherein the $N_1$ rotor core segment is provided with a plurality of $N_1$ auxiliary grooves, the $N_2$ rotor core segment is provided with a plurality of $N_2$ auxiliary grooves, the $N_3$ rotor core segment is provided with a plurality of $N_3$ auxiliary grooves, . . . , and the $N_n$ rotor core segment is provided with a plurality of $N_n$ auxiliary grooves;
wherein center points of two $N_1$ auxiliary grooves on two sides of a magnetic pole axis of the $N_1$ rotor core segment are offset respectively by an $N_{1-1}$ angle and an $N_{1-2}$ angle with respect to the magnetic pole axis, center points of two $N_2$ auxiliary grooves on two sides of a magnetic pole axis of the $N_2$ rotor core segment are offset respectively by an $N_{2-1}$ angle and an $N_{2-2}$ angle with respect to the magnetic pole axis, center points of two $N_3$ auxiliary grooves on two sides of a magnetic pole axis of the $N_3$ rotor core segment are offset respectively by an $N_{3-1}$ angle and an $N_{3-2}$ angle with respect to the magnetic pole axis, . . . , and center points of two $N_n$ auxiliary grooves on two sides of a magnetic pole axis of the $N_n$ rotor core segment are offset respectively by an $N_{n-1}$ angle and an $N_{n-2}$ angle with respect to the magnetic pole axis; and
wherein the $N_{1-1}$ and $N_{1-2}$ angles, the $N_{2-1}$ and $N_{2-2}$ angles, the $N_{3-1}$ and $N_{3-2}$ angles, . . . , and the $N_{n-1}$ and $N_{n-2}$ angles are obtained by rotating an $N_x$ rotor core segment in a skewing pole rotation direction of the rotor core segment, where $x \in [1, n]$, wherein x is an integer selected from a set of 1 to n, wherein n is an integer that is at least 2, and wherein E indicates that x is an element of the set,
wherein the group comprises three adjacent rotor core segments, and if in the three adjacent rotor core segments, the $N_1$ auxiliary groove and the $N_3$ auxiliary groove are offset respectively by an $N_1$ offset angle and an $N_3$ offset angle with respect to the $N_2$ auxiliary groove, the $N_{1-1}$ angle=the $N_{2-1}$ angle−the preset angle+the $N_1$ offset angle;

the $N_{1-2}$ angle=the $N_{2-2}$ angle+the preset angle−the $N_1$ offset angle;

the $N_{3-1}$ angle=the $N_{2-1}$ angle+the preset angle−the $N_3$ offset angle;

the $N_{3-2}$ angle=the $N_{2-2}$ angle−the preset angle+the $N_3$ offset angle, wherein the $N_1$ offset angle, the $N_3$ offset angle and the preset angle are different from each other.

2. The rotor core according to claim 1 wherein the $N_1$ offset angle and the $N_3$ offset angle are both less than the preset angle.

3. The rotor core according to claim 1, wherein the $N_1$ offset angle and the $N_3$ offset angle are both zero.

4. The rotor core according to claim 1, wherein the $N_1$ offset angle or the $N_3$ offset angle is equal to the preset angle.

5. The rotor core according to claim 1, wherein the cross-sectional shapes of the auxiliary grooves are at least one of an arc, triangle, square, trapezoid and rectangle shape.

6. The rotor core according to claim 1, wherein the plurality of rotor core segments are formed by laminating rotor punching pieces.

7. The rotor core according to claim 1, wherein the plurality of the rotor core segments are arranged in two groups, each of the two groups are symmetrical in the axial direction, and the shapes and/or positions of the auxiliary grooves on the rotor core segments in each group are not completely the same.

8. The rotor core according to claim 7, wherein the cross-sectional shapes of the auxiliary grooves are at least one of an arc, triangle, square, trapezoid and rectangle shape.

9. A permanent magnet synchronous motor comprising:
a stator; and
a rotor that includes a rotor core having:
a plurality of rotor core segments mutually staggered by a preset angle, with the rotor core segments formed by laminating rotor punching pieces,
wherein each of the rotor core segments includes therein magnet slots along a circumferential direction,
wherein at least one magnet is disposed in the magnet slots, and
wherein an outer circular surface of each of the plurality of rotor core segments is provided thereon with a number of auxiliary grooves extending across the respective segment in an axial direction, and at least one of positions and cross-sectional shapes of the auxiliary grooves on the rotor core segments are not completely the same so as to suppress torque ripple and vibration noise when a step-skewing motor rotates, wherein the plurality of the rotor core segments are arranged in groups,
wherein a group comprises n number of adjacent rotor core segments, which are respectively an $N_1$ rotor core segment, an $N_2$ rotor core segment, an $N_3$ rotor core segment, . . . , and an $N_n$ rotor core segment;
wherein the $N_1$ rotor core segment is provided with a plurality of $N_1$ auxiliary grooves, the $N_2$ rotor core segment is provided with a plurality of $N_2$ auxiliary grooves, the $N_3$ rotor core segment is provided with a plurality of $N_3$ auxiliary grooves, . . . , and the $N_n$ rotor core segment is provided with a plurality of $N_n$ auxiliary grooves;
wherein center points of two $N_1$ auxiliary grooves on two sides of a magnetic pole axis of the $N_1$ rotor core segment are offset respectively by an $N_{1-1}$ angle and an $N_{1-2}$ angle with respect to the magnetic pole axis, center points of two $N_2$ auxiliary grooves on two sides of a magnetic pole axis of the $N_2$ rotor core segment are offset respectively by an $N_{2-1}$ angle and an $N_{2-2}$ angle with respect to the magnetic pole axis, center points of two $N_3$ auxiliary grooves on two sides of a magnetic pole axis of the $N_3$ rotor core segment are offset respectively by an $N_{3-1}$ angle and an $N_{3-2}$ angle with respect to the magnetic pole axis, . . . , and center points of two $N_n$ auxiliary grooves on two sides of a magnetic pole axis of the $N_n$ rotor core segment are offset respectively by an $N_{n-1}$ angle and an $N_{n-2}$ angle with respect to the magnetic pole axis; and
wherein the $N_{1-1}$ and $N_{1-2}$ angles, the $N_{2-1}$ and $N_{2-2}$ angles, the $N_{3-1}$ and $N_{3-2}$ angles, . . . , and the $N_{n-1}$ and $N_{n-2}$ angles are obtained by rotating an $N_x$ rotor core segment in a skewing pole rotation direction of the rotor core segment, where $x \in [1, n]$, wherein x is an integer selected from a set of 1 to n, wherein n is an integer that is at least 2, and wherein $\in$ indicates that x is an element of the set,
wherein the group comprises three adjacent rotor core segments, and if in the three adjacent rotor core segments, the $N_1$ auxiliary groove and the $N_3$ auxiliary groove are offset respectively by an $N_1$ offset angle and an $N_3$ offset angle with respect to the $N_2$ auxiliary groove, the $N_{1-1}$ angle=the $N_{2-1}$ angle−the preset angle+the $N_1$ offset angle;

the $N_{1-2}$ angle=the $N_{2-2}$ angle+the preset angle−the $N_1$ offset angle;

the $N_{3-1}$ angle=the $N_{2-1}$ angle+the preset angle−the $N_3$ offset angle;

the $N_{3-2}$ angle=the $N_{2-2}$ angle−the preset angle+the $N_3$ offset angle, wherein the $N_1$ offset angle, the $N_3$ offset angle and the preset angle are different from each other.

10. The permanent magnet synchronous motor according to claim 9, wherein the plurality of the rotor core segments are arranged in two groups, each of the two groups are symmetrical in the axial direction, and the shapes and/or positions of the auxiliary grooves on the rotor core segments in each group are not completely the same.

11. The permanent magnet synchronous motor according to claim 9, wherein the $N_1$ offset angle and the $N_3$ offset angle are both less than the preset angle.

12. The permanent magnet synchronous motor according to claim 9, wherein the $N_1$ offset angle and the $N_3$ offset angle are both zero.

13. The permanent magnet synchronous motor according to claim 9, wherein the $N_1$ offset angle or the $N_3$ offset angle is equal to the preset angle.

14. The permanent magnet synchronous motor according to claim 9, wherein the cross-sectional shapes of the auxiliary grooves are at least one of an arc, triangle, square, trapezoid and rectangle shape.

* * * * *